US011628687B1

(12) United States Patent
Coates

(10) Patent No.: US 11,628,687 B1
(45) Date of Patent: Apr. 18, 2023

(54) PROTECTIVE COVERING FOR CASTER ASSEMBLY

(71) Applicant: Andre Kafeleh Coates, Sacramento, CA (US)

(72) Inventor: Andre Kafeleh Coates, Sacramento, CA (US)

( * ) Notice: Subject to any disclaimer, the term of this patent is extended or adjusted under 35 U.S.C. 154(b) by 0 days.

(21) Appl. No.: 17/550,035

(22) Filed: Dec. 14, 2021

Related U.S. Application Data

(60) Provisional application No. 63/217,613, filed on Jul. 1, 2021.

(51) Int. Cl.
*B60B 33/00* (2006.01)
*B60B 7/06* (2006.01)

(52) U.S. Cl.
CPC .......... *B60B 33/0028* (2013.01); *B60B 7/066* (2013.01); *B60B 33/0039* (2013.01)

(58) Field of Classification Search
CPC ... B60B 33/00; B60B 33/0002; B60B 33/006; B60B 33/0021; B60B 33/0028; B60B 33/0039; B60B 33/0049; B60B 33/0057; B60B 33/0068; B60B 33/0073; B60B 2200/20; B60B 2360/322; B60B 2900/116; B60B 2900/351; B60B 2900/572; B60B 7/00; B60B 7/06; B60B 7/061; B60B 7/066; Y10T 16/207; Y10T 16/216; Y10T 16/184; A47B 91/00; A47B 91/12; A47B 95/043; A47B 2095/046; A47C 19/024
See application file for complete search history.

(56) References Cited

U.S. PATENT DOCUMENTS

| | | | |
|---|---|---|---|
| 2,981,969 A | | 5/1961 | Fontana |
| 3,166,780 A | * | 1/1965 | Schultz, Jr. ......... B60B 33/0002 384/615 |
| 3,349,426 A | | 10/1967 | Haydock |
| 3,486,185 A | * | 12/1969 | Gerhard ................. B60B 33/00 16/18 R |
| 4,013,808 A | * | 3/1977 | Crawford ............... B60B 33/00 29/434 |
| D274,788 S | | 7/1984 | Simonsen |

(Continued)

FOREIGN PATENT DOCUMENTS

| | | | | |
|---|---|---|---|---|
| CN | 103661533 | | 3/2014 | |
| GB | 2565758 A | * | 2/2019 | ............. B60B 33/00 |

(Continued)

*Primary Examiner* — Chuck Y Mah
(74) *Attorney, Agent, or Firm* — John Rizvi; John Rizvi, P.A.- The Patent Professor

(57) ABSTRACT

A protective covering is provided for covering an axle of a caster assembly including an exterior side that has an outer wall and an outer sidewall about a perimeter of and extending from the outer wall, and an interior side that has an inner wall recessed within the outer side and an inner sidewall extending from the inner sidewall. A main channel is defined within the recess of the interior side is configured to receive a leg of a bracket of the caster assembly and releasably retain the leg therein such that the protective covering is coupled to a side of the caster assembly. The exterior side preferably partially or entirely covers a hub of a wheel of the caster assembly and thereby reduces the likelihood of debris entering a cavity defined between the hub and the leg thereof.

20 Claims, 6 Drawing Sheets

(56) References Cited

U.S. PATENT DOCUMENTS

| | | |
|---|---|---|
| 5,123,143 A | 6/1992 | Carmack |
| 5,615,450 A | 4/1997 | Butler |
| 5,873,144 A | 2/1999 | Tupper |
| 8,407,854 B2 * | 4/2013 | Tsai ................... B60B 7/06 16/45 |
| 8,484,801 B2 * | 7/2013 | Li ................... B60B 33/063 16/18 CG |
| 9,108,462 B1 | 8/2015 | Stone |
| 10,442,246 B2 * | 10/2019 | Barker ............... B60B 33/00 |
| 2011/0138571 A1 | 6/2011 | Tsai |
| 2013/0097808 A1 | 4/2013 | Long et al. |
| 2016/0121651 A1 * | 5/2016 | Choi ............... B60B 33/0023 16/39 |
| 2020/0238757 A1 * | 7/2020 | Roedel ............ B60B 33/0015 |

FOREIGN PATENT DOCUMENTS

| | | | |
|---|---|---|---|
| JP | H0745366 | | 10/1995 |
| JP | 2000203206 | | 7/2000 |
| JP | 2000203207 A | * | 7/2000 |
| JP | 2001161755 A | * | 6/2001 |
| JP | 2004058954 A | * | 2/2004 |
| JP | 3617006 B2 | * | 2/2005 |

* cited by examiner

PROTECTIVE COVERING FOR CASTER ASSEMBLY

CROSS-REFERENCE TO RELATED APPLICATION

This application claims the benefit of U.S. Provisional Patent Application No. 63/217,613, filed on Jul. 1, 2021, which is incorporated herein by reference in its entirety.

FIELD OF THE INVENTION

The present invention relates generally to caster assemblies, and more particularly, to a device to cover a side of a caster assembly in a manner that reduces a likelihood of debris contacting and/or collecting adjacent to a wheel axle of a caster assembly.

BACKGROUND OF THE INVENTION

Caster assemblies, or casters, are used to improve mobility of a wide variety of structures such as furniture, carts, and dumpsters. There are different types of caster assemblies (e.g., rigid, swivel, etc.); however, these assemblies generally include certain common components, including a wheel bracket (also referred to as a yoke or a fork) having a base and a pair of spaced apart legs extending from the base, and a wheel rotatably coupled to the legs. The wheel may include a circular hub, a tread about a perimeter of the hub, and a central hole through the hub. The wheel may be coupled to the legs with a wheel axle that is received within and through the central hole of the hub and secured on opposite sides thereof to the legs of the wheel bracket with, for example, threaded nuts or other fasteners.

During use of caster assemblies, debris may contact the axle between the legs and the wheel and become lodged therein or otherwise collect around the axle. This can reduce the mobility and performance of the caster assemblies, and over time cause premature wear. As such, it is quite common that caster assemblies require periodic maintenance to sustain their performance and extend their useable life span. However, caster assembly maintenance can be relatively difficult. For example, caster assemblies are commonly used to improve mobility of relatively heavy structures and, as such, access to the caster assemblies may be limited if maintenance personnel are unable to easily lift the structure to access the caster assemblies therebelow. Further, elongated debris such as hair and wires may become tightly wound around the axles and can be exceedingly difficult to remove, even for relatively light structures. It is not uncommon for routine maintenance to require disassembly of the caster assembly.

As an example, dumpsters are ubiquitous containers used by businesses, communities, schools, construction sites, industrial sites, etc. to temporarily store waste on-site. These containers are generally quite large and are usually emptied by hydraulic lifts on garbage trucks for subsequent disposal of the waste therein. Due to their size and weight, dumpsters often include heavy duty caster assemblies configured to promote ease of short distance movement, for example, by one or more individuals pushing on the dumpster. Due in part to their intended purpose of storing waste as well as the fact that these containers are often stored outdoors, caster assemblies on dumpsters are particularly prone to contact with debris that can reduce performance of the caster assemblies and/or cause premature wear. In addition to their size and weight, which increase the difficulty of maintenance, dumpsters are commonly rented from remote waste management companies who may have less incentive to maintain the performance of the caster assemblies relative to the users who occasionally move the dumpsters.

Accordingly, there is an established need for systems and methods capable of cleaning and/or maintaining caster assemblies or preventing or reducing contact and/or buildup of debris adjacent wheel axles of caster assemblies to maintain performance and mobility, as well as promote longevity of caster assemblies.

SUMMARY OF THE INVENTION

The present invention is directed to a convenient and labor-saving protective covering that is capable of preventing or reducing contact and buildup of debris adjacent wheel axles of caster assemblies to maintain performance and mobility, as well as promote longevity of caster assemblies. The protective covering is configured to couple with a caster assembly to cover a side of a hub of a wheel thereof as well as the axle between the wheel and a leg of the wheel assembly. A pair of protective coverings may be coupled to sides of a caster assembly to cover otherwise exposed portions of the axle partially or entirely between the hub and the legs of the caster assembly.

In a first implementation of the invention, a protective covering for covering an axle of a caster assembly comprises an exterior side comprising an outer wall and an outer sidewall about a perimeter of and extending from the outer wall, and an interior side comprising an inner wall recessed within the outer side and an inner sidewall extending from the inner sidewall. A main channel is defined within the recess of the interior side by and between the inner sidewall alone, or in combination with portions of the outer sidewall and is configured to fittingly engage the caster assembly such that a leg of a bracket of the caster assembly is received within the main channel and releasably retained therein such that the protective covering is coupled to a side of the caster assembly. The exterior side is configured to cover a hub of a wheel of the caster assembly partially or entirely and thereby reduce the likelihood of debris entering a cavity defined between the hub and the leg thereof.

In a second aspect, the protective covering can include a circular central portion and a neck portion extending radially outward from the central portion. The central portion and the neck portion may be defined by regions of the outer wall and the outer sidewall.

In another aspect, the protective covering may include an opening in the neck portion thereof that provides access to a distal end of the main channel.

In another aspect, the protective covering may include the inner sidewall having a first portion that defines a semicircle around a portion of a central axis of the central portion of the protective covering and second portions that extend from the first portion to connect to the neck portion of the protective covering.

In another aspect, the protective covering may include a barrier wall extending from the inner wall between the outer sidewall and the inner sidewall and at least partially encircling the main channel.

In another aspect, the protective covering may include the barrier wall extending into the cavity defined between the hub and the leg of the caster assembly while the leg thereof is retained within the main channel.

In another aspect, the protective covering may include the barrier wall defining a partial circle around the central axis of the central portion that is interrupted or truncated by the inner sidewall.

In another aspect, the protective covering may include the barrier wall extending further from the inner wall than the outer sidewall and/or the inner sidewall.

In another aspect, the protective covering may include a window defined by a hole that provides access to the main channel through and between the outer wall and the inner wall.

In another aspect, the protective covering may include the window having a portion configured to be located between the axle and a fastener coupled to a distal end thereof such that the leg is retained in the main channel due to the fastener acting as a barrier on the portion of the window.

In another aspect, the protective covering may include components of or within the main channel configured to frictionally retain the leg of the caster assembly therein.

In another aspect, the protective covering may include a magnet adjacent the main channel configured to magnetically retain the leg of the caster assembly therein.

In another aspect, the protective covering may include the magnet having a magnetic pull force sufficient to prevent or reduce the likelihood of decoupling in the event of an impact to the caster assembly or the protective covering, while still allowing an individual to manually remove the protective covering from the caster assembly.

In another aspect, the protective covering may include an inner channel defined within the recess of the interior side by and between the inner wall, the inner sidewall, and the barrier wall.

In another aspect, the protective covering may include an outer channel defined within the recess of the interior side by and between the inner wall, the barrier wall, and the outer sidewall.

In another aspect, the protective covering may include portions of the inner wall of the protective covering flush with and against the leg while the leg is retained in the main channel.

In another aspect, the protective covering may include an additional protective covering having a body that is a mirror image of the protective covering, and the pair of protective coverings may be coupled to opposite sides of the caster assembly to simultaneously cover and reduce the likelihood of debris entering a cavity defined between the hub and the leg thereof on respective sides of the caster assembly.

In another aspect, the protective covering may include the main channel having a structure configured to receive a leg of a rigid caster assembly.

In another aspect, the protective covering may include the main channel having a structure configured to receive a leg of a swivel caster assembly.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a convenient and economical protective covering that is capable of covering and thereby protecting an axle of a caster assembly in a manner that results in a reduced likelihood of debris contacting and potentially binding the axle and a wheel coupled thereto.

Figure 1:
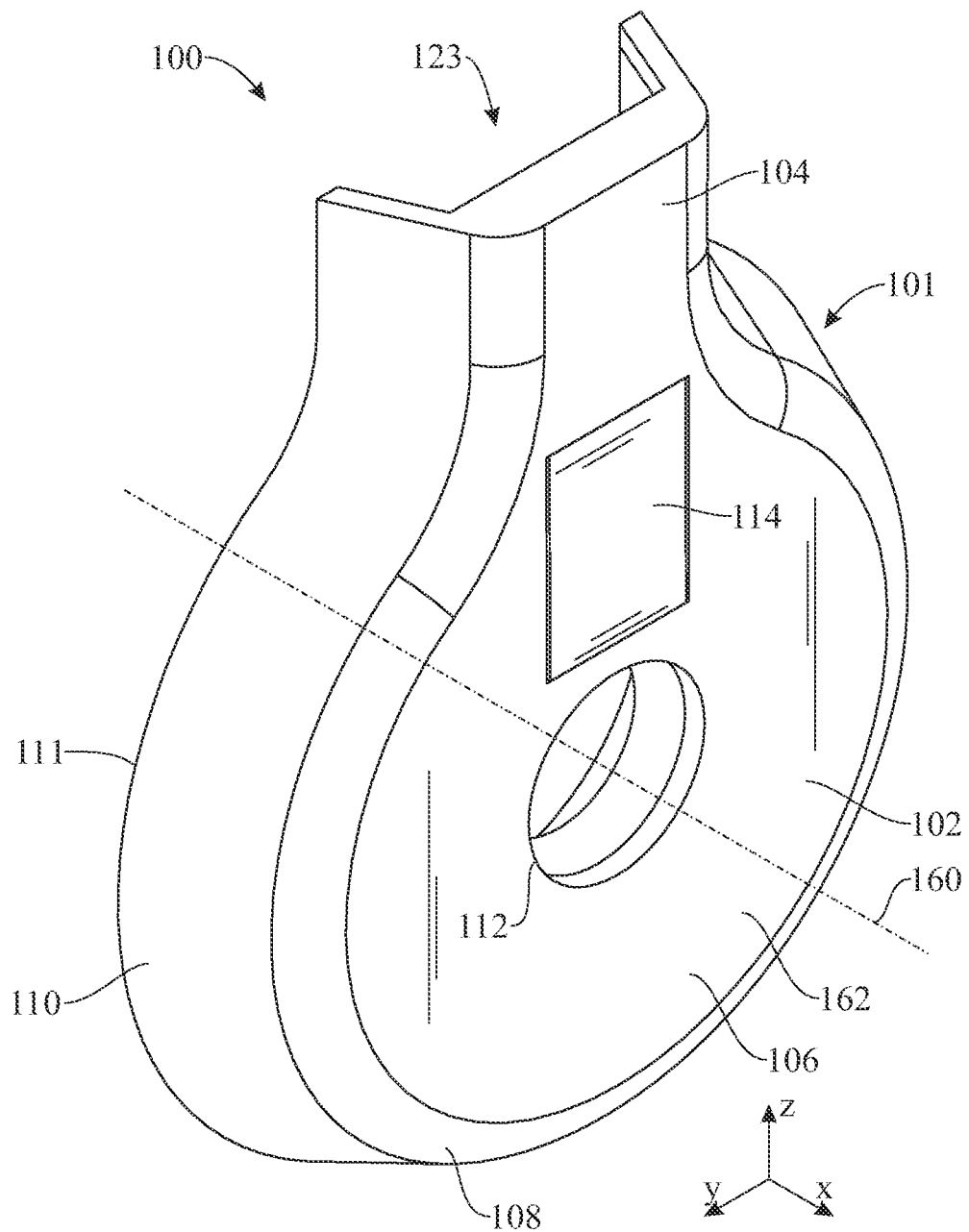
FIG. 1 presents an isometric view of an exterior side of a protective covering in accordance with a first embodiment of the present invention.
Figure 2:
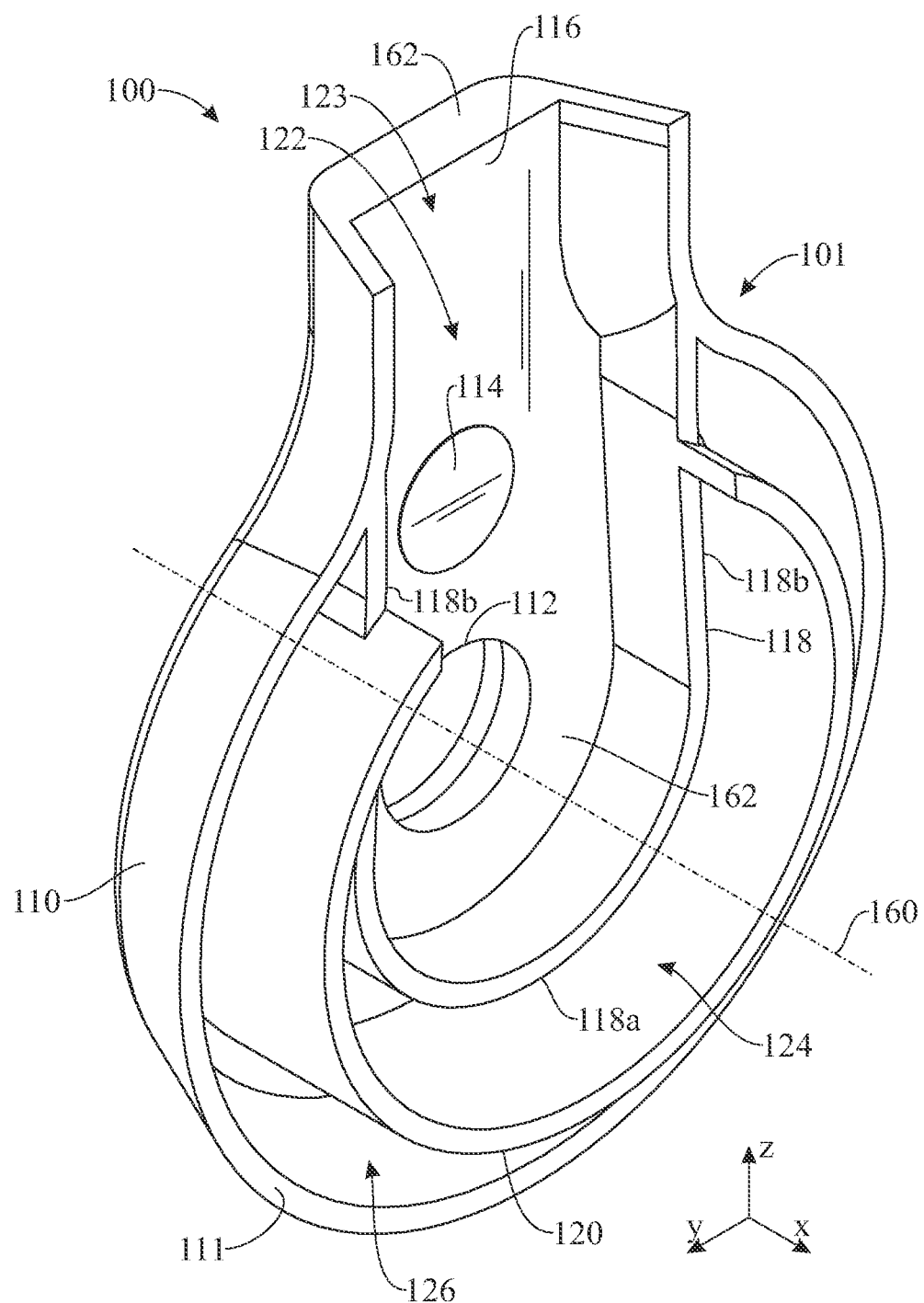
FIG. 2 presents an isometric view of an interior side of the protective covering pf FIG. 1.

Referring initially to FIGS. 1 and 2, a protective covering or wheel shield for use with a caster assembly, hereinafter protective covering 100, is illustrated in accordance with a first exemplary embodiment of the present invention. As shown in the figures, the protective covering 100 includes a main body 101 having a central portion 102 having a circular shape, circularly formed around a central axis 160 thereof, the central axis 160 arranged along a longitudinal direction x. The main body 101 further includes a neck portion 104 extending radially outward from the central portion 102. In the embodiment or orientation shown in the drawings, the neck portion 104 extends generally vertically upward, i.e. along a vertical direction z, from the central portion 102. The main body 101 includes an exterior side (FIG. 1) and an oppositely disposed interior side (FIG. 2).

In the represented example, and with reference to FIG. 1, the exterior side of the main body 101 includes an outer wall 106 and an outer skirt or sidewall 110 coupled about a perimeter of and extending from the outer wall 106. The connection between the outer sidewall 110 and the outer wall 106 may be such that the outer sidewall 110 extends at an angle other than 90 degrees with the outer wall 106, and more preferably flaring radially outward of the outer wall 106, as shown. Optionally, the outer wall 106 and the outer sidewall 110 may be coupled with a fillet, a chamfer, or other means of smoothing the connection therebetween. For example, the non-limiting example of FIGS. 1-6 includes a fillet 108 at the connection between the outer wall 106 and the outer sidewall 110. In a non-limiting example, an instance of which is shown in the drawings, the outer wall 106 may be generally planar or flat and perpendicular to the longitudinal axis x (and thus to the central axis 160), i.e. formed along an y-z plane containing the vertical direction z and a transverse direction y which is perpendicular to the longitudinal direction x and the vertical direction z. In a non-limiting example, the outer sidewall 110 may be generally conical, as shown. As shown, the outer sidewall 110 ends in an inner end or edge 111. The inner edge 111 is circular about the central axis and is arranged along an imaginary plane that is perpendicular to the central axis, for purposes that will be described hereinafter. The outer wall 106, outer sidewall 110, and fillet 108 may extend along both the central portion 102 and the neck portion 104 of the main body 101.

Turning to FIG. 2, the interior side of the main body 101 includes an inner wall 116 coupling with and recessed relative to interior surfaces of the outer sidewall 110. In this example, the outer wall 106 (FIG. 1) and the inner wall 116 are opposite surfaces of an integrally-formed, cover wall structure or cover portion 162; however, in certain embodiments the outer wall 106 and the inner wall 116 may be separate wall structures jointly forming a cover portion. The inner wall 116 may be generally planar or flat and perpendicular to the longitudinal axis x and formed along an y-z plane. An inner skirt or sidewall 118 extends from the inner wall 116 within a boundary defined by the interior surfaces of the outer sidewall 110. The inner sidewall 118 may extend longitudinally from the inner wall 116. The inner sidewall 118 includes a first portion 118a that defines a semicircle around a portion of the central axis 160 of the central portion 102 and second portions 118b that extend from the first portion 118a to connect to the outer sidewall 110 at the neck portion 104 of the main body 101. The depicted second portions 118b are spaced-apart from one another and parallel to one another. The first and second portions 118a and 118b may form a U-shaped arrangement. An intermediate skirt or barrier wall 120 extends from the inner wall 116 between the outer sidewall 110 and the inner sidewall 118 and defines a partial circle around the central axis 160 of the central portion 102 that is interrupted or truncated by the second portions 118b of the inner sidewall 118, such that the barrier wall 120 extends from one of the second portions 118b to the other second portion 118b along a gap formed between the outer sidewall 110 and the inner sidewall 118. The barrier wall 120 may be generally parallel to the inner sidewall 118; for example, in the present embodiment, the barrier wall 120 also extends longitudinally from the inner wall 116. In certain embodiments, the barrier wall 120 may extend further from the inner wall 116 along the longitudinal direction x than the outer sidewall 110 and/or the inner sidewall 118, such that the barrier wall 120 protrudes longitudinally outward from an inner edge of the outer sidewall 110 and/or the inner sidewall 118. For example, in the present embodiment, the barrier wall 120 extends longitudinally further and protrudes longitudinally outward of both an inner edge of the outer sidewall 110 and an inner the inner sidewall 118.

With continued reference to FIG. 2, channels are defined within the recess of the interior side, including a main channel 122 defined by and between the inner wall 116 and the inner sidewall 118, an inner channel 124 defined by and between the inner wall 116, the inner sidewall 118, and the barrier wall 120, and an outer channel 126 defined by and between the inner wall 116, the barrier wall 120, and the outer sidewall 110. The outer channel 126 is arranged radially outward of the inner channel 124, which in turn is arranged radially outward of an end area of the main channel 122 defined between the inner wall 116 and the first portion 118a of the inner sidewall 118. An opening 123 is provided between ends of the outer sidewall 110 at a distal end of the neck portion 104 which provides access to a distal end of the main channel 122. A window 112 is defined by a through hole that provides access to the main channel 122 through and between the outer wall 106 and the inner wall 116. As shown, the window 112 may be formed around the central axis 160, with the central axis 160 arranged centrally within the window 112. For instance, the window 112 may be circular, as shown. Preferably, the barrier wall 120 encircles a portion of the main channel 122.

Figure 3:
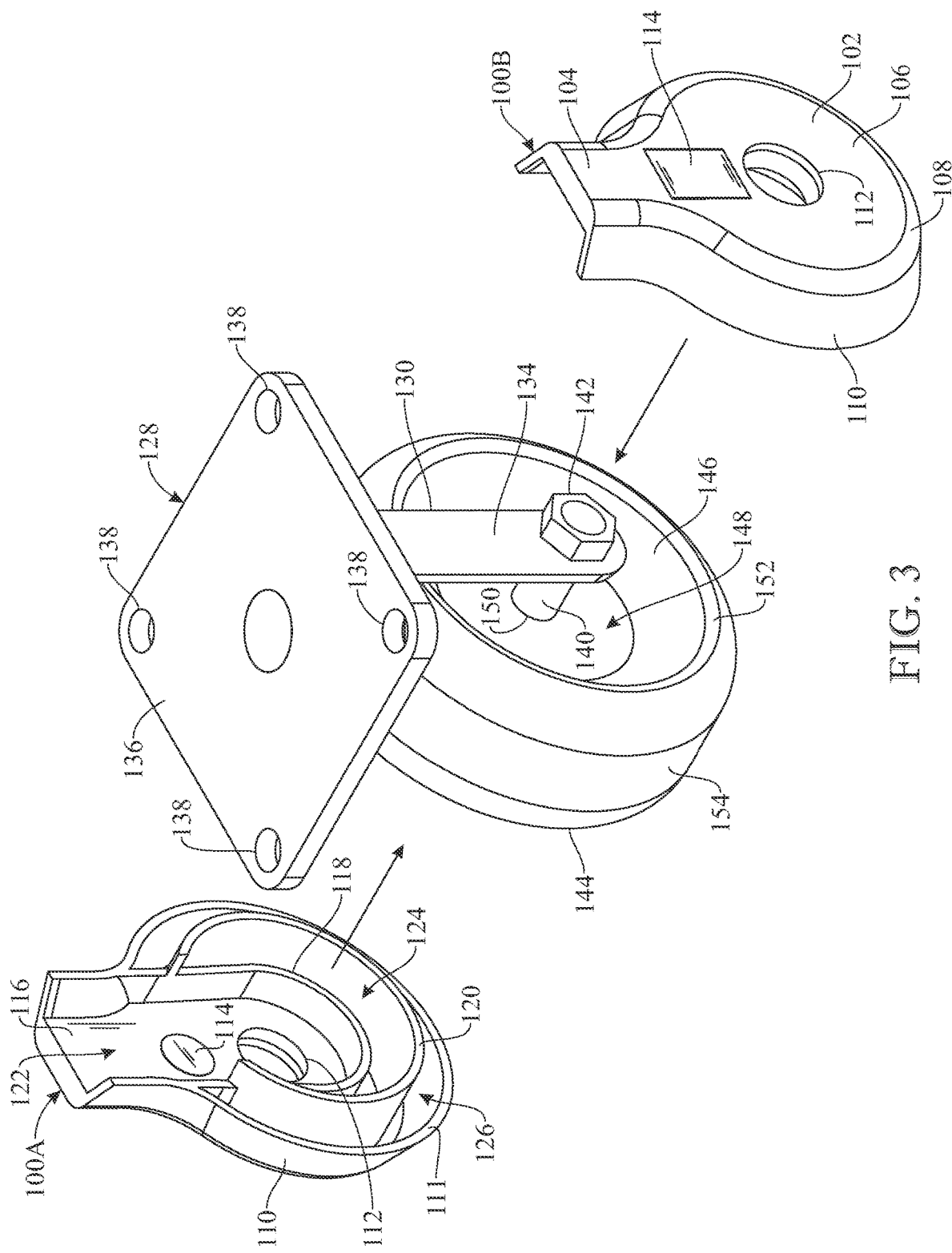
FIG. 3 presents an exploded isometric view of a pair of protective coverings of the type represented in FIGS. 1 and 2, with a caster assembly.

As noted previously, the protective covering 100 is configured to cover and thereby protect an axle of a caster assembly. The illustrations of FIGS. 3-6 represent an exemplary caster assembly 128 which may be used in conjunction with the invention. The caster assembly 128 is shown together with a pair of protective coverings 100A and 100B having structures that are mirror images of one another and configured to protect opposite sides of the caster assembly 128. Unless otherwise expressed, the protective coverings 100A, 100B may be referred to individually hereinafter with reference numerals 100A, 100B or may be generally referred to using reference numeral 100. With reference to FIGS. 3 and 6, the caster assembly 128 includes a wheel bracket 130 having a base 132 (FIG. 6) and a pair of spaced apart legs 134 extending from the base 132, a wheel 144 rotatably coupled to the legs 134, and a mounting plate or top plate 136 coupled to the base 132 opposite the legs 134 and extending generally transversely to the legs 134. The wheel 144 includes a circular hub 146, a tread 154 about a perimeter of the hub 146, and a central hole 150 through the hub 146. The wheel 144 is coupled to the legs 134 with a wheel axle 140 that is received within and through the central hole 150 of the hub 146 and secured on opposite sides thereof to the legs 134 of the wheel bracket 130 with threaded nuts 142. The top plate 136 may include mounting holes 138 or other means for securing the top plate 136 to a structure. For clarity of this description, the caster assembly 128 is represented as a rigid caster wherein the wheel bracket 130 is fixed to the top plate 136. However, the protective covering 100 is not limited to this type of caster assembly 128 and may be used to cover other types of caster assemblies such as swivel casters wherein the wheel bracket 130 is rotatably coupled to the top plate 136 and the legs 134 are offset or angled relative thereto.

To cover and protect the axle 140, the protective covering 100 may be releasably coupled to a side of the caster assembly 128. In this example, the main channel 122 is configured to receive and fittingly engage one of the legs 134 of the wheel bracket 130 and retain the leg 134 therein. In this position, the protective covering 100 overlays a portion or an entirety of the one leg 134 of the wheel bracket 130 and overlays a portion or an entirety of a corresponding side of the hub 146 of the wheel 144. The protective covering 100 may include various means for retaining the leg 134 within the main channel 122. In certain embodiments, the protective covering 100 may include components (not shown) of or within the main channel 122 configured to frictionally retain the leg 134 of the caster assembly 128 therein. For instance and without limitation, opposite ends of the outer sidewall 110 in the area of the neck portion 104 may be spaced apart to frictionally receive the leg 134. In certain embodiments, the window 112 of the protective covering 100 may include a portion configured to be located between the axle 140 and a fastener coupled to a distal end thereof (e.g., a ledge, a flange, or other structure) such that the leg 134 is retained in the main channel 122 due to the fastener acting as a barrier on the portion of the window 112. In the example presented in the figures, the protective covering 100 includes a magnet 114 within or adjacent to the main channel 122 that acts to magnetically couple the protective covering 100 to the covered leg 134 of the wheel bracket 130 and thereby retain the leg 134 within the main channel 122. For instance, the magnet 114 may be located at the inner wall 116 and/or outer wall 106, facing the channel 122; more specifically, in the present embodiment, the magnet 114 is located at the cover portion 162 which provides the inner and outer walls 116 and 106. In certain embodiments, the magnet 114 may provide a magnetic pull force sufficient to prevent or reduce the likelihood of decoupling in the event of an impact to the caster assembly 128 or the protective covering 100, while still allowing an individual to manually remove the protective covering 100 from the caster assembly 128 by hand (e.g., without tools). A nonlimiting example of a magnet that may be suitable for use with the protective covering 100 is a magnet providing about 60 lbs. (about 27 kg) of magnetic pull force.

Figure 4:
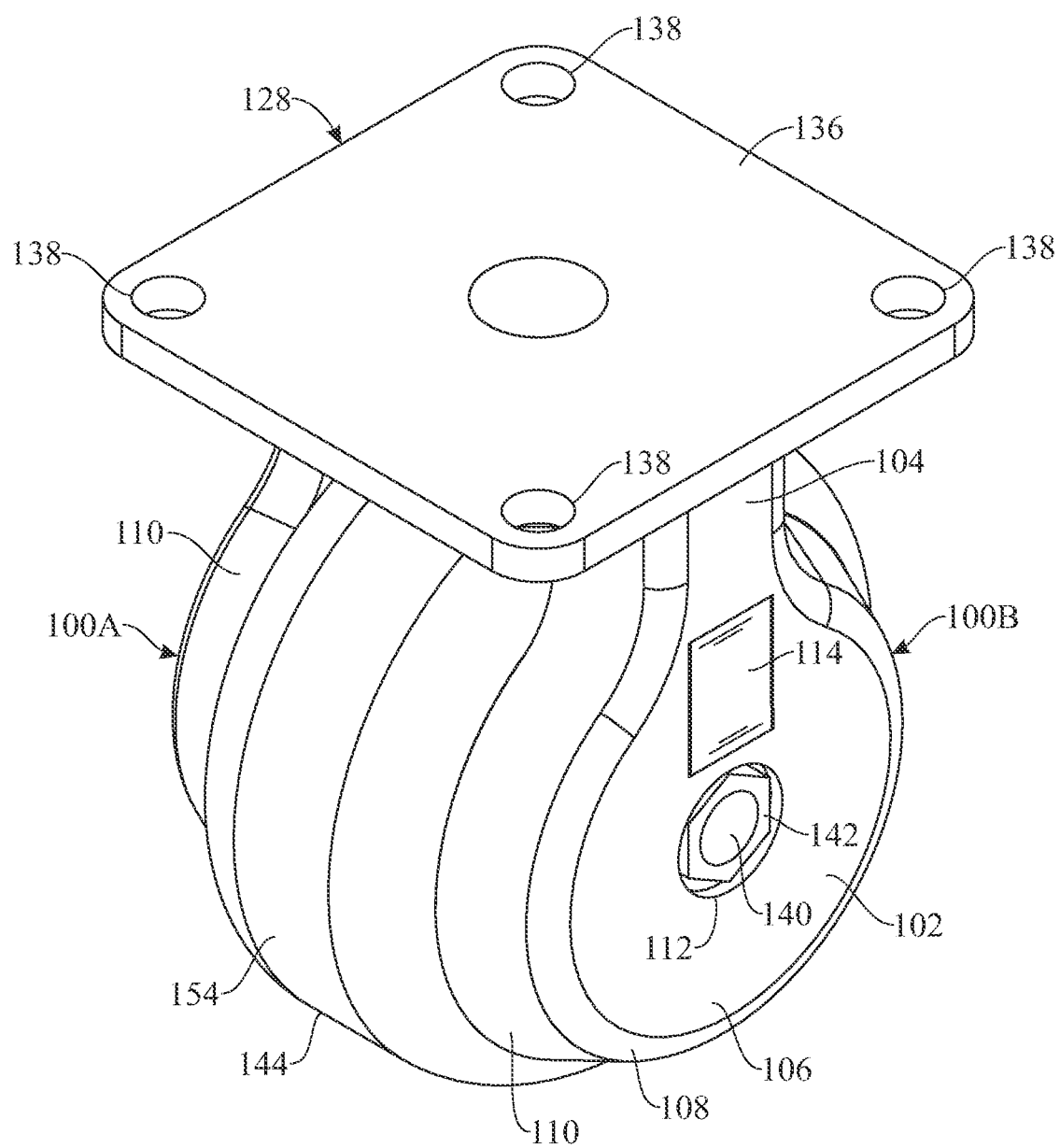
FIG. 4 presents a top isometric view of the pair of protective coverings of FIG. 3 coupled to the caster assembly.
Figure 5:
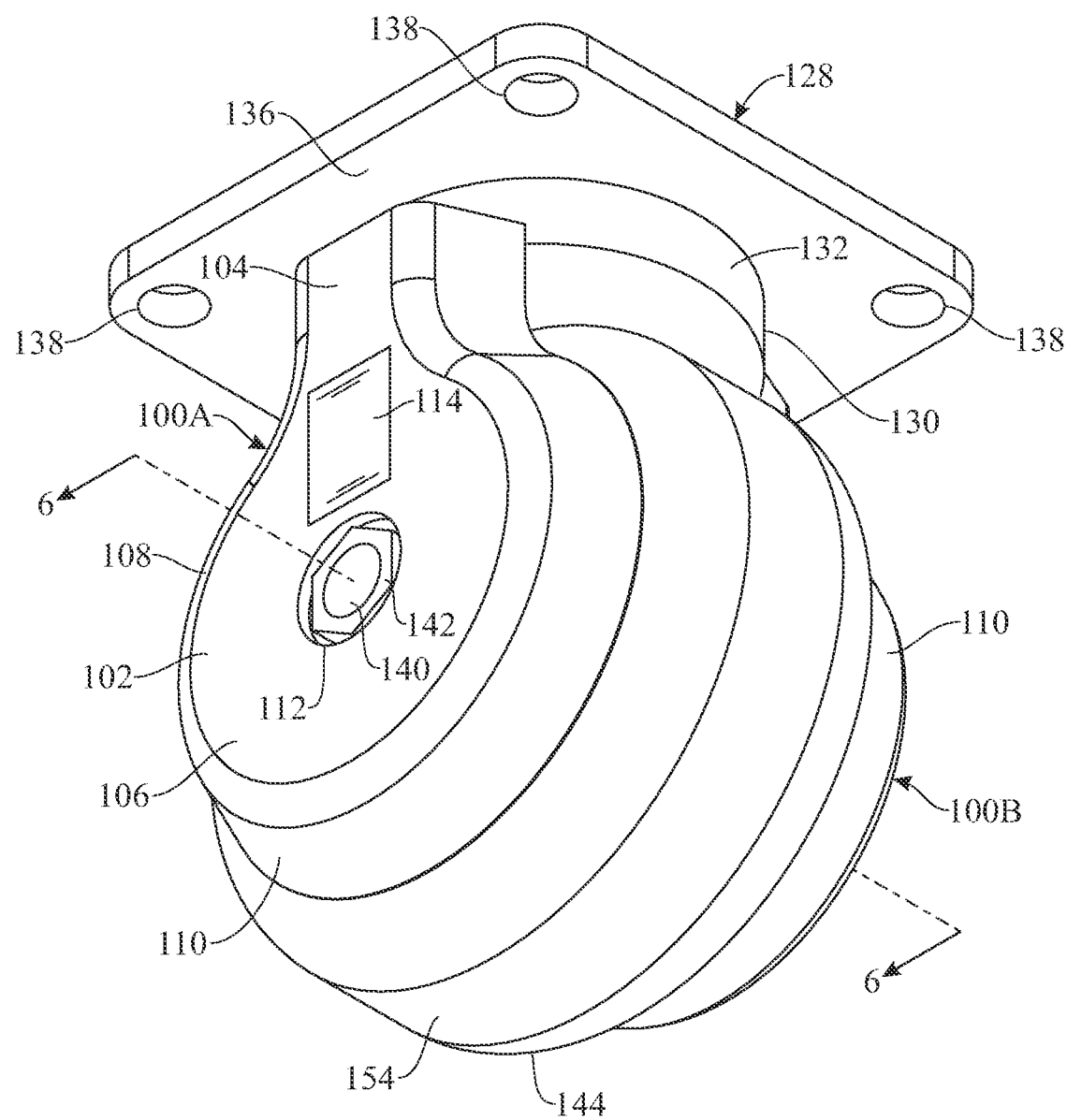
FIG. 5 presents a bottom isometric view of the pair of protective coverings of FIG. 3 coupled to the caster assembly.
Figure 6:
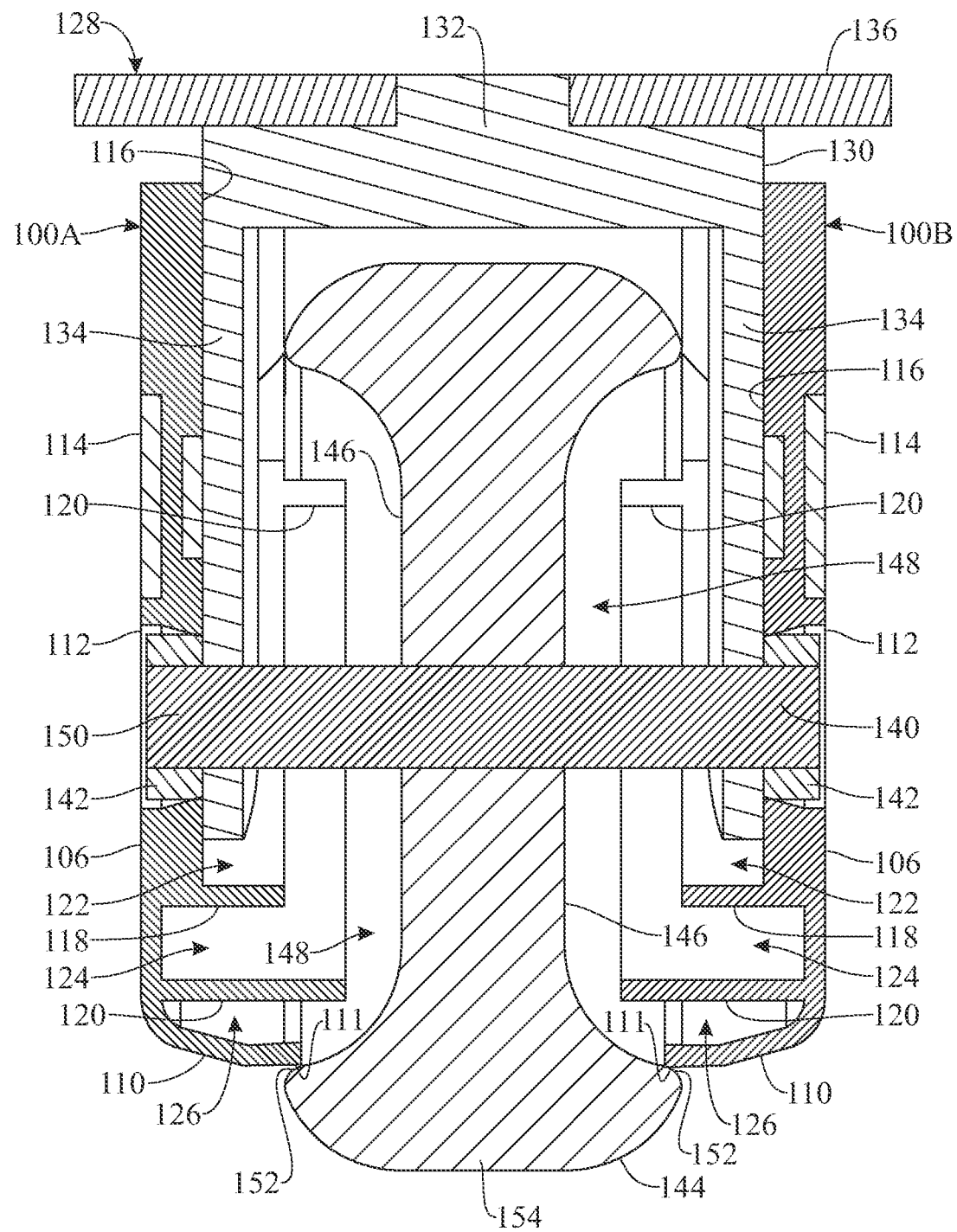
FIG. 6 presents a cross-sectional side view of the protective coverings and caster assembly along a line labeled 6 in FIG. 5.

The illustrations of FIGS. 4-6 represent the aforementioned pair of protective coverings 100A and 100B having structures that are mirror images of one another, being coupled to opposite sides of the caster assembly 128 to simultaneously cover and reduce the likelihood of debris entering a cavity 148 defined between the hub 146 and the leg 134 thereof on respective sides of the caster assembly 128. In this example, the outer sidewalls 110 of each of the protective coverings 100 extend to or over rims 152 of the hub 146, and along the rims 152 to entirely cover the respective side of the hub 146. The inner edge 111 of the outer sidewall 110, which is arranged along a plane that is perpendicular to the wheel axle similarly to the rims 152, may thus be positioned significantly proximate to and along the rims 152 to minimize the space between the inner edge 111 and the rims 152 to prevent debris from passing therethrough and yet allow the wheels to turn. Distal ends of the axle 140 and the nuts 142 coupled thereto are received within the windows 112 of the protective coverings 100. As further shown in the cross-sectional side elevation view of FIG. 6, while the protective coverings 100 are coupled to sides of the caster assembly 128, portions of the inner walls 116 of the protective coverings 100 are flush with and against the corresponding legs 134. In addition, the barrier walls 120 and the inner sidewalls 118 extend into the cavity 148 defined between the hub 146 of the wheel 144 and the legs 134 of the wheel bracket 130, around the axle 140 and the corresponding leg 134. In certain embodiments, the central portion 102 of the protective covering 100 does not overlay portions of the tread 154 of the wheel 144. Preferably, the protective covering 100 covers the noted exterior portions of the caster assembly 128 without significantly increasing the exterior footprint thereof.

While the protective covering 100 is coupled to the caster assembly 128, the outer wall 106 prevents or reduces the likelihood of debris entering the cavity 148 between the hub 146 and the leg 134 laterally, the outer sidewall 110 prevents or reduces the likelihood of debris entering the cavity 148 from between edges of the outer sidewall 110 and the wheel 144 (e.g., the rim 152 of the hub 146), and the barrier wall 120, inner sidewall 118, outer channel 126, and inner channel 124 may individually or in combination prevent or reduce the likelihood of debris that potentially enters the cavity 148 from contacting or winding around the axle 140. In this manner, the protective covering 100 provides multiple layers of protection to the axle 140 of the caster assembly 128 and thereby promotes performance, mobility, and longevity of the caster assembly 128.

For example, debris that is able to enter the cavity 148 despite the presence of the outer wall 106 and the outer sidewall 110 may collect within the outer channel 126 and/or the inner channel 124 rather than accumulating on or adjacent to the axle 140 and may be retained within the outer channel 126 and/or the inner channel 124 by the barrier wall 120 and/or inner sidewall 118. These structures may further reduce the likelihood of elongated debris (e.g., hair, wire, etc.) from becoming wound about or entangled with the axle 140.

As an additional benefit, in certain embodiments the protective cover is easily removable from the side of the caster assembly 128 without disassembly of the caster assembly 128 and without the need to lift or flip over the structure to which the caster assembly 128 is mounted. This feature may significantly promote ease of maintenance by allowing a user to easily remove the protective cover, remove any debris that has accumulated on the interior side thereof, for example, within the outer channel 126 and/or the inner channel 124, and then recouple the protective cover to the side of the caster assembly 128. This easy removal of the protective cover 100 may be provided, for instance, in embodiments in which the protective cover is coupled to the caster assembly 128 frictionally (e.g., snap-on) or magnetically (e.g., with magnet), such as in the present embodiment. In such embodiments, end users may be able to manually remove and clean the interior sides of the protective covering 100 without the need for specific tools.

Alternative embodiments are contemplated in addition the embodiments(s) shown and/or described herein. For example, as noted above the protective covering 100 may include various means or multiple means of coupled to and being retained on the sides of the caster assembly 128. In addition, other structures of the protective covering 100 may be modified while still providing protection to the axle 140 of the caster assembly 128. For example, components of the exterior side may cover less than an entirety of the hub 146, the inner sidewall 118 and/or the barrier wall 120 may have different shapes, layouts, or lengths than those described herein, and additional walls and/or channels may be provided on the interior side.

The protective cover is preferably molded from plastic materials or other synthetic or semi-synthetic polymers, for example: ABS resins, acetyl resins, nylon resins, urethane resins, or high impact polystyrene resins. Some embodiments, such as the embodiment shown in the drawings and described herein, may be advantageously manufactured into a single-piece unit by plastics injection molding and thus manufactured expeditiously and at reasonable cost.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A protective covering for covering an axle of a caster assembly, the protective covering comprising:
  a main body comprising:
    a cover portion formed about a central axis, the cover portion comprising an outer wall and an opposite inner wall facing an exterior side and an interior side of the main body, respectively;
    an inner sidewall extending from the inner wall of the cover portion towards the interior side, the inner sidewall and inner wall defining and enclosing an elongated, main channel, wherein the main channel is formed surrounding the central axis and extending radially outward of the central axis and comprises an end opening formed at a distal end of the main channel, wherein the distal end of the main channel is located at a periphery of the main body and provides access to the main channel; and
    an outer sidewall comprising a circular portion arranged radially outward of the inner sidewall, the circular portion extending from the cover portion towards the interior side, the circular portion further extending from opposite sides of the inner sidewall at opposite sides of the main channel such that an interior space is defined between and enclosed by the inner wall, the inner sidewall and the circular portion of the outer sidewall, and wherein the circular portion of the outer sidewall ends in an inner edge that is circular about the central axis.

2. The protective covering of claim 1, wherein the inner edge of the circular portion of the outer sidewall is arranged along a plane that is perpendicular to the central axis.

3. The protective covering of claim 1, wherein the outer sidewall is arranged flaring radially outward from the cover portion.

4. The protective covering of claim 1, wherein the cover portion and outer sidewall further extend radially outward of the inner sidewall forming a neck portion, the neck portion defining the distal end of the main channel.

5. The protective covering of claim 4, wherein the outer sidewall is arranged flaring outward from the cover portion at the neck portion.

6. The protective covering of claim 1, wherein the inner wall is generally planar and perpendicular to the central axis.

7. The protective covering of claim 1, wherein the cover portion is generally planar and perpendicular to the central axis.

8. The protective covering of claim 1, further comprising a magnet carried by the cover portion adjacent the main channel and configured to magnetically retain a metallic item within the main channel.

9. The protective covering of claim 8, wherein the magnet is provided between at the inner wall.

10. The protective covering of claim 1, further comprising a barrier wall extending from the inner wall towards the interior side and through the interior space, the barrier wall at least partially encircling the main channel, wherein the barrier wall is arranged between and in spaced-apart relationship with the outer sidewall and the inner sidewall, wherein an inner channel is defined between the barrier wall and the inner sidewall and about the central axis, and an outer channel is defined between the barrier wall and the outer sidewall and about the central axis, wherein the inner and outer channels are separated from the main channel.

11. The protective covering of claim 10, wherein the barrier wall is circularly formed around the central axis.

12. The protective covering of claim 10, wherein the barrier wall is parallel to the inner sidewall.

13. The protective covering of claim 10, wherein the barrier extends further from the inner wall than the outer sidewall.

14. The protective covering of claim 10, wherein the barrier extends further from the inner wall than the inner sidewall.

15. The protective covering of claim 10, wherein the barrier extends circularly from opposite sides of the inner sidewall at opposite sides of the main channel.

16. The protective covering of claim 1, further comprising a window extending through the cover portion from the outer wall to the inner wall and about the central axis, the window providing access to the main channel from outside the main body.

17. The protective covering of claim 1, wherein the main body is integrally-formed into a single-piece unit.

18. The protective covering of claim 1, further comprising a second main body, which is a mirror image of the main body.

19. A protective covering for covering an axle of a caster assembly, the protective covering comprising:
  a main body comprising:
    a cover portion formed about a central axis, the cover portion comprising an outer wall and an opposite inner wall facing an exterior side and an interior side of the main body, respectively;
    an inner sidewall extending from the inner wall of the cover portion towards the interior side, the inner sidewall and inner wall defining and enclosing an elongated, main channel, wherein the main channel is formed surrounding the central axis and extending radially outward of the central axis and comprises an end opening formed at a distal end of the main channel, wherein the distal end of the main channel is located at a periphery of the main body and provides access to the main channel; and
    an outer sidewall comprising a circular portion arranged radially outward of the inner sidewall, the circular portion extending from the cover portion towards the interior side, the circular portion further extending from opposite sides of the inner sidewall at opposite sides of the main channel such that an interior space is defined between and enclosed by the inner wall, the inner sidewall and the circular portion of the outer sidewall, and wherein the circular portion of the outer sidewall ends in an inner edge that is circular about the central axis, wherein the inner edge of the circular portion of the outer sidewall is arranged along a plane that is perpendicular to the central axis.

20. A protective covering for covering an axle of a caster assembly, the protective covering comprising:
  a main body comprising:
    a cover portion formed about a central axis, the cover portion comprising an outer wall and an opposite inner wall facing an exterior side and an interior side of the main body, respectively;

an inner sidewall extending from the inner wall of the cover portion towards the interior side, the inner sidewall and inner wall defining and enclosing an elongated, main channel, wherein the main channel is formed surrounding the central axis and extending radially outward of the central axis and comprises an end opening formed at a distal end of the main channel, wherein the distal end of the main channel is located at a periphery of the main body and provides access to the main channel;

an outer sidewall comprising a circular portion arranged radially outward of the inner sidewall, the circular portion extending from the cover portion towards the interior side, the circular portion further extending from opposite sides of the inner sidewall at opposite sides of the main channel such that an interior space is defined between and enclosed by the inner wall, the inner sidewall and the circular portion of the outer sidewall, and wherein the circular portion of the outer sidewall ends in an inner edge that is circular about the central axis, wherein the inner edge of the circular portion of the outer sidewall is arranged along a plane that is perpendicular to the central axis; and a barrier wall extending from the inner wall towards the interior side and through the interior space, the barrier wall at least partially encircling the main channel, wherein the barrier wall is circularly formed about the central axis and arranged between and in spaced-apart relationship with the outer sidewall and the inner sidewall, wherein an inner channel is defined between the barrier wall and the inner sidewall and about the central axis, and an outer channel is defined between the barrier wall and the outer sidewall and about the central axis, wherein the inner and outer channels are separated from the main channel, and further wherein the barrier extends further from the inner wall than the outer sidewall.

* * * * *